3,220,955
COMPOSITION, NON-CORROSIVE TO
METAL SURFACES
Walter E. Kramer, Niles, and Charanjit Rai, Robert C. Kimble, and John B. Braunwarth, Crystal Lake, Ill., assignors, by mesne assignments, to Union Oil Company of California, Los Angeles, Calif., a corporation of California
No Drawing. Filed Nov. 9, 1961, Ser. No. 151,189
2 Claims. (Cl. 252—391)

This invention relates to a new class of corrosion inhibitors comprising bisbenzothiazolyl derivatives having interconnecting polyhydroxyalkane, alkene, or thiaalkane linkages. The compounds of this invention can be represented by the formula:

(1)
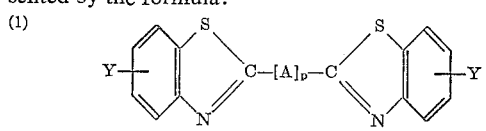

wherein A is a divalent polyhydroxy alkane group, a divalent alkene group, or a divalent thiaalkane group, $p$ is an integer, and Y is a substituent such as an alkyl radical having up to 10 carbon atoms, an alkoxy radical having up to 10 carbon atoms, or a halogen.

When A is a divalent polyhydroxy alkane group, a sub-genus under Formula 1 becomes (2)
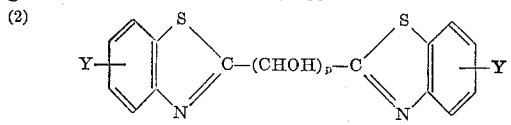

of the bisbenzothiazolyl polyhydroxyalkanes, wherein $p$ is an integer and Y is a substituent as just defined.

When A is a divalent alkene group, a sub-genus under Formula 1 becomes (3)
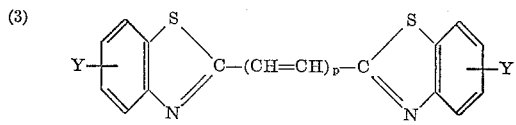

or the bisbenzothiazolyl alkenes, wherein $p$ is an integer and Y is a substituent as just defined.

And where A is a divalent thiaalkane group, a sub-genus under Formula 1 becomes (4)
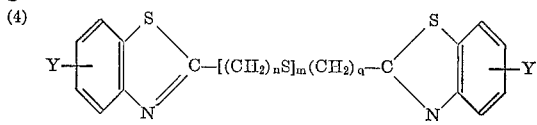

or the bisbenzothiazolyl thiaalkanes, wherein $n$, $m$ and $q$ are integers and Y is a substituent as just defined.

This invention is based on the discovery that compounds of Formula 1 when present in small amounts in an environment substantially reduce the corrosivity thereof. More particularly, the invention is based on the discovery that small amounts, on the order of 0.01 to 0.2 g./100 ml. of solution, of the compounds of Formula 1 are corrosion inhibitors for aerated aqueous media, especially in aerated solutions of commercial detergent compositions.

It becomes therefore a primary object of this invention to provide a novel class of corrosion inhibitors defined by Formula 1 supra.

An object of this invention is to provide a novel class of corrosion inhibitors as defined by Formula 1 supra for aqueous media.

An object of this invention is to provide a novel class of corrosion inhibitors as defined by Formula 1 supra for aerated aqueous media.

Another object of this invention is to provide a novel class of corrosion inhibitors as defined by Formula 1 supra for aerated solutions of commercial detergent compositions.

Another object of this invention is to provide corrosion inhibitors defined by Formula 2 supra, e.g., bisbenzothiazolyl polyhydroxyalkanes.

Still another object of this invention is to provide corrosion inhibitors defined by Formula 3 supra, e.g., bisbenzothiazolyl alkenes.

Aand another object of this invention is to provide corrosion inhibitors defined by Formula 4 supra, e.g., bisbenzothiazolyl thiaalkanes.

Still a further object of this invention is to provide corrosion inhibitors comprising a mixture of any combination of two or all three of the bisbenzothiazolyl derivatives as defined by Formula 1, or Formulae 2, 3 and 4.

These and other objects of this invention will be described or become apparent as the specification proceeds.

Metal surfaces are easily oxidized and corroded by contact with aerated aqueous solutions, but most of the systems can be inhibited by the incorporation of small amounts of various organic chemicals. For example, amines, mercaptans, heterocyclic nitrogen compounds, substituted ureas and thioureas, etc., containing nitrogen, oxygen, sulfur, and other members of Groups V and VI of the Periodic Table, are effective in many aqueous environments.

Commercial detergent compositions, however, have presented an especially severe problem because of their polyphosphate contents. The polyphosphates tend to dissolve the copper or zinc from alloys such as brass, and to solubilize the metals as metal polyphosphate anions. Because the detergents prevent the deposition of protective films on the metal surfaces, little success has been realized heretofore in combating the corrosiveness of aqueous detergent solutions.

In accordance with this invention, we have discovered that corrosion inhibitors selected from the group consisting of bisbenzothiazolyl polyhydroxy alkanes, bisbenzothiazolyl alkenes, and bisbenzothiazolyl thiaalkanes, and mixtures thereof, have utility as corrosion inhibitors and are especially effective corrosion inhibitors in aqueous solutions or aerated aqueous solutions, or in solutions of commercial detergent compositions.

These compounds are used at low concentrations, preferably within the range of about 0.01–0.2 g./100 ml. of solution, or roughly 1–50% by wt. of the weight of detergent in the solution.

The invention is illustrated by the following examples:

Example I

The effectiveness of the inhibitors of Formula 2 was demonstrated experimentally by a series of experiments with aqueous solutions of "Tide," a commercial detergent composition containing mixed aryl alkyl sulfonates, sodium tripolyphosphate, sodium sulfate, and other components. First, a water solution of "Tide" (0.5 g./100 ml. water) was prepared and divided into two flasks, and sufficient 1,2-bis(2-benzothiazolyl)ethanediol was added to the solution in one flask to achieve a concentration of 0.1 g./100 ml. of solution. Then, two brass strips (½" x 3") were immersed in the solution in each flask, and air was bubbled through the solutions at a rate of 20–30 ml./min. for a period of 72 hours while the temperature was maintained at 70° C. The weight losses from the brass strips were as follows:

| Compound added | Weight loss [1] (percent) | Corrosion, inches/yr. |
|---|---|---|
| None | 1.41 | 0.0062 |
| 1,2-bis(2-benzothiazolyl)ethanediol | 0.06 | 0.0001 |

[1] Average of two coupons.

Example II

The effectiveness of the inhibitors of Formula 3 was also demonstrated by a series of experiments with aqueous solutions of "Tide." First, a water solution of "Tide" (0.5 g. detergent/100 ml. water) was prepared and divided into several flasks, and sufficient bisbenzothiazolyl-alkane, bisbenzothiazolyl-alkene, or bisbenzothiazole was added to each of several flasks to achieve concentrations of 0.1 g./100 ml. solution. Finally, two brass strips (½" x 3") were immersed in the solution in each flask, and air was bubbled through the solutions at a rate of 20–30 ml./min. for a period of 72 hours while the temperature was maintained at 70° C. The weight losses from the brass strips were as follows:

| Compound added | Weight loss [1] (percent) | Corr., inches/yr. |
| --- | --- | --- |
| None | 1.60 | 0.0060 |
| 1,2-bis(2-benzothiazolyl)ethane | 1.38 | 0.0049 |
| 1,6-bis(2-benzothiazolyl)hexane | 1.34 | 0.0054 |
| 1,2-bis(2-benzothiazolyl)ethylene | 0.51 | 0.0017 |
| bis-benzothiazole | 0.84 | 0.0031 |

[1] Average of two coupons.

Example III

The effectiveness of the inhibitors of Formula 4 was also demonstrated by a series of experiments with aqueous solutions of "Tide." First, a water solution of Tide (0.5 g./100 ml. water) was prepared and divided into several flasks. Then various bisbenzothiazolylalkanes and thiaalkanes were added to the flasks at concentrations of about 0.1 g./100 ml. of water. Finally, two brass coupons (½" x 3") were immersed in the solutions in each flask, and air was bubbled through the solutions at a rate of 20–30 ml./min. for a period of 72 hours while the temperature was maintained at 70° C. The weight losses from the brass strips were as follows:

| Inhibitor | Weight loss [1] (percent) | Corr., inches/yr. |
| --- | --- | --- |
| None | 1.60 | 0.0060 |
| 1,2-bis(2-benzothiazolyl)ethane | 1.38 | 0.0049 |
| 1,6-bis(2-benzothiazolyl)hexane | 1.34 | 0.0054 |
| 1,5-bis(2-benzothiazolyl)3-thiapentane | 0.60 | 0.0025 |

[1] Average of two coupons.

The invention has been demonstrated by a number of non-limiting examples, and it is to be understood that these examples are only illustrative. Thus, the invention is directed to compounds of Formula 1 and also to compounds of Formulae 2, 3 and 4 thereunder as used as corrosion inhibitors.

The corrosion inhibitors of this invention are used in the same manner as prior art corrosion inhibitors are used to combat the deterioration of metal surfaces in contact with a corrosive environment. The metal surfaces to be protected may be ferrous metals, alloys, plated metals, tin, iron, aluminum, brass, copper, bearing metals, castings, machine parts and the like which are in contact with aqueous environments or aerated aqueous environments, or aerated aqueous commercial detergent environments. The corrosive atmospheres counteracted by the corrosion inhibitors of this invention may contain acids, alkali, salts, organic materials, solvents, water and emulsifiers, ordinary soaps, modern detergents and the like. The corrosion inhibitors of this invention are particularly effective against the corrosive action of aerated aqueous solutions that are used in many processes, and are also particularly effective against the corrosive action of aqueous solutions of synthetic detergents and emulsifiers.

Examples of such synthetic detergents and emulsifiers that can be present in the aqueous environments to be protected by the corrosion inhibitors of this invention are dodecylbenzene sulfonic acid, salts of fatty acid tertiary amines, alkylaryl sulfonates, alkylaryl sulfonates having molecular weights of 465 to 480, alkylaryl polyether alcohols, polyglycol esters, disodium N-octadecylsulfonsuccinamate, tetrasodium N-(1,2-dicarboxyethyl)-N-octadecyl-sulfosuccinamate, diamyl ester of sodium sulfosuccinic acid, ethanolated alkyl guanidine amine complexes, isopropyl naphthalene sodium sulfonate, alkali metal petroleum sulfonates, alkaline earth metal petroleum sulfonates, fatty amides, blends of alkalis and detergents, polyoxyethylated nonylphenols, polyoxyalkylene esters and sulfonates, and the like, which are either of anionic, nonionic, or cationic type. These detergents and emulsifiers are used in textile processing, electroplating, car washing, metal pickling, grease emulsifiers, emulsion paints, adhesives, cleaning compositions, dishwashing compositions, and the like. The corrosion inhibitors of this invention find application in the preparation, handling, and use of these types of detergent compositions.

Accordingly, this invention contemplates non-corrosive fluent mixtures of an inert solvent and the corrosion inhibitors disclosed herein or fluent mixtures of a detergent in an inert solvent and the corrosion inhibitors and also solid or semi-solid compositions such as soaps and greases. The fluent mixtures can be in the form of solutions, suspensions or concentrates containing a small amount, a soluble amount or a suspendable amount of the corrosion inhibitors.

Suitable solvents, inert as regards any reactivity toward the corrosion inhibitors but exhibiting a corrosive action to metal under the conditions of use, include water, liquid hydrocarbons, lubricating oils, neutral lubricating oils, bright stock, solvent extracts from the solvent refining of mineral lubricating oils, naphthas, kerosene, gasoline, grease, vegetable, animal and fish oils, synthetic esters, cleaning solvents and the like, containing or not containing detergents, emulsifiers or other addends. The corrosion-inhibiting amounts may vary from 0.01 to 0.2 g./100 ml. of the composition for most purposes, but larger amounts up to about 10 g./100 ml. of composition may be used.

Expressed on a weight percent basis a corrosion-inhibiting amount can be from about 0.01 to 0.2 wt. percent or about 0.01% to about 5.0% or about 10% by weight for solutions, suspensions and concentrates depending on the nature of the carrier composition, solid, semi-solid or liquid used therewith and the solubility or suspendability of the corrosion inhibitor therein. The inhibitors of this invention may be dissolved or suspended in an inert solid, semi-solid fluid or fluid composition as a concentrate to be added or incorporated in a final composition by blending, grinding, dilution, etc. Cleaning pads composed of soap or detergent compositions and steel wool, copper mesh or wire mesh are specific examples of solid or semi-solid carrier compositions to which the corrosion inhibitors of this invention can be added.

The invention also contemplates a method of inhibiting the corrosion of metals or alloys in contact with a corrosive fluid (gaseous or liquid) atmosphere by incorporating an effective and corrosion-inhibiting amount of the corrosion inhibitors disclosed herein. The method is carried out by adding or introducing the corrosion inhibitor per se or as a fluent mixture into systems in contact with such corrosive atmospheres. The rate of introduction or the amount of corrosion inhibitor used is varied in accordance with the demands of the system in order to accomplish the intended result.

The properties and method of preparing the compounds of this invention are disclosed in copending application, Serial No. 151,190, filed November 9, 1961 (now abandoned) by Charanjit Rai and John B. Braunwarth.

The embodiments of the invention in which an exclusive property or privilege is claimed are defined as follows:

1. A composition, non-corrosive to metal surfaces in contact therewith in the presence of air consisting of water and about 0.01 to 0.2 gm. of 1,2-bis(2-benzothiazolyl ethanediol per 100 ml. of water, as the sole corrosion-inhibiting component.

2. A composition, non-corrosive to metal surfaces in contact therewith in the presence of air consisting of water and about 0.01 to 0.2 gm. of 1,5-bis(2-benzothiazolyl)3-thiopentane per 100 ml. of water, as the sole corrosion-inhibiting component.

References Cited by the Examiner
UNITED STATES PATENTS

| | | | |
|---|---|---|---|
| 2,483,392 | 10/1949 | Meyer et al. | 260—240 |
| 2,618,603 | 11/1952 | Schaeffer | 252—391 XR |
| 2,618,605 | 11/1952 | Schaeffer | 252—137 |
| 2,618,606 | 11/1952 | Schaeffer | 252—137 |
| 2,832,735 | 4/1958 | Hughes | 252—391 |
| 2,905,667 | 9/1959 | Siegrist et al. | 260—240 |
| 2,968,629 | 1/1961 | Thompson | 252—389 |
| 2,983,688 | 5/1961 | Marsh et al. | 252—389 |
| 2,985,661 | 5/1961 | Hein et al. | 260—304 |
| 3,076,812 | 2/1963 | Ackermann et al. | 260—304 XR |

JULIUS GREENWALD, *Primary Examiner.*

JOSEPH R. LIBERMAN, *Examiner.*